United States Patent
Lin et al.

(10) Patent No.: US 8,368,752 B2
(45) Date of Patent: Feb. 5, 2013

(54) DOCUMENT CAMERA WITH SIZE-ESTIMATING FUNCTION AND SIZE ESTIMATION METHOD

(75) Inventors: Shi-Qiang Lin, Taipei (TW); Yu-Shan Huang, Taipei (TW); Chao-Hung Chang, Taipei (TW); Hsuan-Hung Liu, Taipei (TW)

(73) Assignee: Avermedia Information, Inc., Taipei (TW)

( * ) Notice: Subject to any disclaimer, the term of this patent is extended or adjusted under 35 U.S.C. 154(b) by 98 days.

(21) Appl. No.: 12/980,173

(22) Filed: Dec. 28, 2010

(65) Prior Publication Data

US 2011/0157407 A1 Jun. 30, 2011

(30) Foreign Application Priority Data

Dec. 29, 2009 (TW) .............................. 98145583 A

(51) Int. Cl.
*H04N 7/18* (2006.01)
*G06F 3/12* (2006.01)
*G06K 9/66* (2006.01)

(52) U.S. Cl. ...................... 348/140; 358/1.15; 382/194

(58) Field of Classification Search .................. 382/194, 382/203, 221; 348/134–142
See application file for complete search history.

(56) References Cited

U.S. PATENT DOCUMENTS

| 6,262,763 B1 * | 7/2001 | Totsuka et al. ................ 348/135 |
| 2008/0101784 A1 * | 5/2008 | Hsu ................................ 396/89 |
| 2008/0252723 A1 * | 10/2008 | Park .............................. 348/143 |
| 2009/0034841 A1 * | 2/2009 | Tang ............................. 382/173 |

* cited by examiner

*Primary Examiner* — Aung S Moe
*Assistant Examiner* — Mekonnen Dagnew
(74) *Attorney, Agent, or Firm* — Kirton McConkie; Evan R. Witt

(57) ABSTRACT

A size estimation method is used with a document camera to estimate an object size. The document camera includes a lens and an image sensor. The size estimation method includes the following steps. Firstly, an object distance between the lens and the object is detected. According to the object distance and a viewable angle of the lens, a shooting zone size is estimated. Then, the object is shot by the lens and the image sensor, thereby acquiring a digital image including an image of the object. Then, an effective pixel number corresponding to the object image is counted. Afterward, the size of the object is estimated according to the effective pixel number, a total pixel number of the image sensor and the shooting zone size.

20 Claims, 8 Drawing Sheets

| pixel | H | | | | | | | | |
|---|---|---|---|---|---|---|---|---|---|
| | 1 | ... | 222 | 223 | ... | ... | 1887 | 1888 | ... | 1944 |

| V | | | | | | | | | | |
|---|---|---|---|---|---|---|---|---|---|---|
| | 1 | 0 | 0 | 0 | 0 | 0 | 0 | 0 | 0 | 0 |
| | 2 | 0 | 0 | 0 | 0 | 0 | 0 | 0 | 0 | 0 |
| | 3 | 0 | 0 | 0 | 0 | 0 | 0 | 0 | 0 | 0 |
| | : | 0 | 0 | 0 | 0 | 0 | 0 | 0 | 0 | 0 |
| | : | 0 | 0 | 0 | 0 | 0 | 0 | 0 | 0 | 0 |
| | 112 | 0 | 0 | 1 | 1 | 1 | 0 | 0 | 1 | 0 | 0 |
| | 113 | 0 | 0 | 1 | 1 | 1 | 0 | 0 | 1 | 0 | 0 |
| | 114 | 0 | 0 | 1 | 1 | 1 | 1 | 0 | 1 | 0 | 0 |
| | : | 0 | 0 | 1 | 1 | 1 | 1 | 1 | 0 | 0 | 0 |
| | : | 0 | 0 | 0 | 1 | 1 | 1 | 1 | 0 | 0 | 0 |
| | 2441 | 0 | 0 | 1 | 1 | 1 | 1 | 1 | 1 | 0 | 0 |
| | 2442 | 0 | 0 | 1 | 1 | 1 | 1 | 1 | 1 | 0 | 0 |
| | 2443 | 0 | 0 | 0 | 0 | 1 | 1 | 1 | 0 | 0 | 0 |
| | 2444 | 0 | 0 | 0 | 0 | 1 | 1 | 1 | 0 | 0 | 0 |
| | 2445 | 0 | 0 | 0 | 0 | 0 | 0 | 1 | 0 | 0 | 0 |
| | : | 0 | 0 | 0 | 0 | 0 | 0 | 0 | 0 | 0 | 0 |
| | : | 0 | 0 | 0 | 0 | 0 | 0 | 0 | 0 | 0 | 0 |
| | 2590 | 0 | 0 | 0 | 0 | 0 | 0 | 0 | 0 | 0 | 0 |
| | 2591 | 0 | 0 | 0 | 0 | 0 | 0 | 0 | 0 | 0 | 0 | effective pixels
H:1667 pixel (H222~H1888)
V:2334 pixel (V112~V2445)

DOCUMENT CAMERA WITH SIZE-ESTIMATING FUNCTION AND SIZE ESTIMATION METHOD

FIELD OF THE INVENTION

The present invention relates to a document camera, and more particularly to a document camera which can estimate an actual size of an object according to object image size and object distance.

BACKGROUND OF THE INVENTION

A document camera is a special video camera designed to make a presentation, hold a meeting or give a lecture in classroom, boardroom, or conference. In the document camera, lens and some adjustable mechanical structures cooperate with each other to capture the image of a two or three-dimensional object, and the captured digital image of the object is shown on a display device to be viewed by the user and the audience. Moreover, through a data line, the captured digital image of the object may be stored in a storage device or shared with other users.

FIG. 1 is a schematic diagram illustrating a document camera for capturing and showing an image of an object according to the prior art. As shown in FIG. 1, the document camera 10 has a lens 101 for focusing and capturing the image of an object 11. The object 11 is for example a fish-like sculpture. After the fish-like sculpture 11 is placed under the lens 101, the fish-like sculpture 11 is shot by the lens 101, and the captured digital image 121 is shown on a display device 12.

When the digital image 121 of the object 11 is shown on the display device 12, the aspect ratio of the object 11 may be realized. For example, the size of the fish body relative to the fish tail can be known from the digital image 121. However, the actual size of the fish-like sculpture 11 fails to be realized from the digital image 121. That is, the digital image 121 shown on the display device 12 is the magnified or minified image of the object 11, but the actual size of the object 11 fails to be directly realized by referring to the digital image 121.

For facilitating the user to realize the actual size of the object 11, a coin (not shown) or a ruler 13 may be placed beside the object 11. By comparing the image of the ruler 13 with the digital image 121, the user may estimate the actual size of the object 11. Another approach provides graduations on the lens 101. By referring to the graduations, the user may estimate the actual size of the object 11.

Although the ruler 13 or the graduations may facilitate the user to estimate the size of the object 11 according to the digital image 121 shown on the display device 12, there are still some drawbacks. For example, the ruler 13 should be additionally prepared and the estimated size of the object 11 is obtained through size conversion in one's head, but not directly obtained. In addition, if the object 11 needs to be periodically and frequently shot, the object 11 and the ruler 13 should be adjusted for each shot. As such, it is inconvenient to operate the document camera 10. For example, it is troublesome for the user to record and observe the plant growth every hour.

Moreover, since the actual size of the object 11 is obtained through size conversion, the resolution or the orientation of the lens 101 may incur measuring error regardless of whether the ruler 13 is placed at the lens side or the object side. After the digital image 121 is acquired, the position and orientation of the ruler image in the digital image 121 is fixed. For example, when the user wants to realize the diagonal length of the object 11, but the ruler 13 is horizontally placed, the diagonal length is usually obtained by inaccurate estimation.

Moreover, since the size conversion about the actual size is interpreted in an inaccurate manner, it is difficult to estimate the length of a curve or the area of an irregular pattern.

From the above description, the conventional document camera is not feasible to estimate the actual size of an object. Therefore, there is a need of providing an improved document camera so as to obviate the drawbacks encountered from the prior art.

SUMMARY OF THE INVENTION

In accordance with an aspect, the present invention provides a size estimation method for use with a document camera. The document camera includes a lens and an image sensor. The size estimation method includes the following steps. Firstly, an object distance between the lens and the object is detected. According to the object distance and a viewable angle of the lens, a shooting zone size is estimated. Then, the object is shot by the lens and the image sensor, thereby acquiring a digital image including an object image. Then, an effective pixel number corresponding to the object image is counted. Afterward, the size of the object is estimated according to the effective pixel number, a total pixel number of the image sensor and the shooting zone size.

In accordance with an aspect, the present invention provides a document camera for observing an object. The document camera includes a lens, an image sensor and a controlling unit. The lens is separated from the object by an object distance and has a viewable angle. A shooting zone size is estimated according to the object distance and the viewable angle of the lens. The image sensor is in communication with the lens for capturing a digital image including an object image. The controlling unit is in communication with the image sensor for counting an effective pixel number corresponding to the object image, and estimating the size of the object according to the effective pixel number, a total pixel number of the image sensor and the shooting zone size.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF THE PREFERRED EMBODIMENT

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
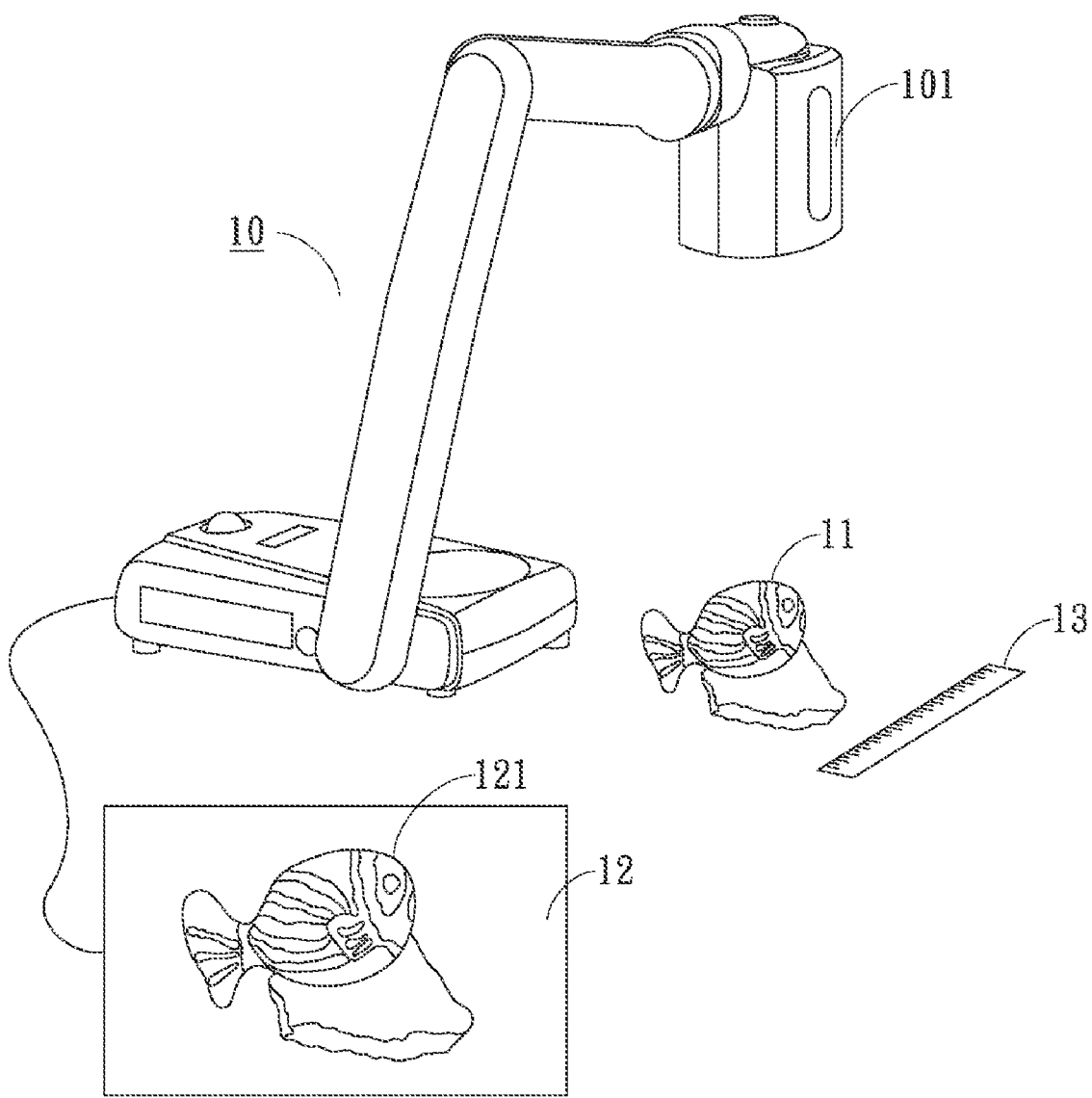
FIG. 1 is a schematic diagram illustrating a document camera for capturing and showing an image of an object according to the prior art.

As previously described in the prior art (see FIG. 1), when an object is shot by the conventional document camera to show a digital image on the display device, the user fails to directly realize the actual size of the object. Although some kinds of document cameras may estimate the size of the object, the additional size conversion procedure is inconvenient and inaccurate.

For obviating the drawbacks from the prior art, the present invention provides a document camera having a function of automatically estimating the actual size of an object. Moreover, the document camera may have the function of estimating the actual size corresponding to a selected region of a digital image. In other words, the use of the document camera of the present invention to observe the object is directly perceived and convenient.

Figure 2A:
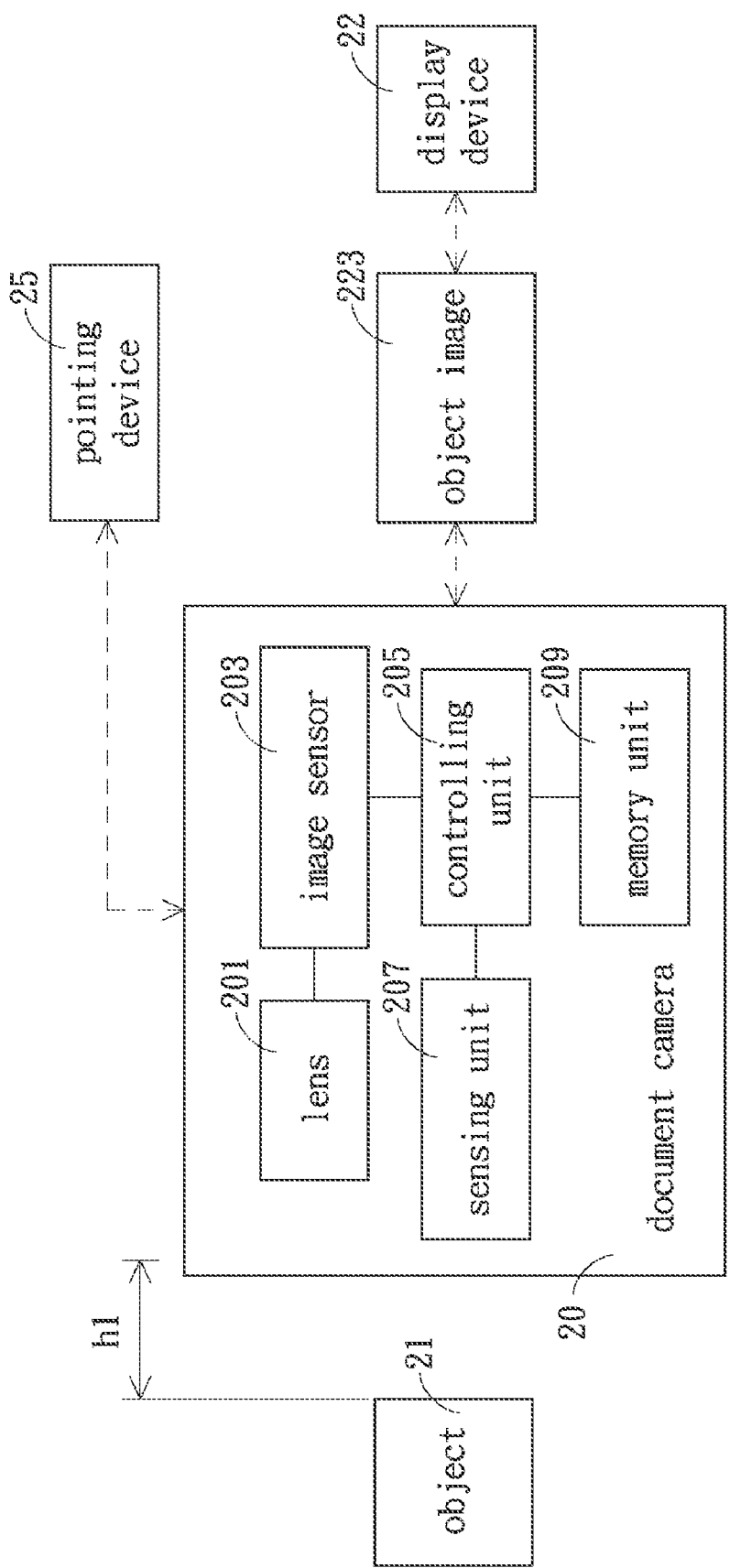
FIG. 2A is a schematic functional block diagram illustrating the connection between a document camera, a display device, an object and a pointing device according to an embodiment of the present invention.

FIG. 2A is a schematic functional block diagram illustrating the connection between a document camera 20, a display device 22, an object 21 and a pointing device 25 according to an embodiment of the present invention. As shown in FIG. 2A, the document camera 20 is separated from the object 21 by an object distance h1. The document camera 20 is in communication with the display device 22 and the pointing device 25 through a data line or a network in order to exchange image data.

The document camera 20 is used for capturing the image of the object 21. The document camera 20 includes a lens 201, an image sensor 203 and a controlling unit 205. The distance between the lens 201 and the object 21 is called as the object distance h1. According to the object distance h1 and a viewable angle of the lens 201, a shooting zone size is estimated. The image sensor 203 is in communication with the lens 201 for shooting the object 21, thereby acquiring a digital image 221. The controlling unit 205 is in communication with the image sensor 203. The controlling unit 205 is used for counting an effective pixel number in the digital image 221. According to the effective pixel number, the total pixel number of the image sensor 203 and the shooting zone size, the actual size corresponding to the object 21 will be estimated.

The controlling unit 205 may acquire a proportional relation between the shooting zone size and the total pixel number of the image sensor 203. According to the proportional relation and the effective pixel number, the controlling unit 205 can estimate the actual size corresponding to the object 21. It is to be noted that the term "object" in the description may indicate a separate object, a group of objects or a focused portion of a separate object.

Optionally, the document camera 20 further includes a sensing unit 207 and a memory unit 209. The sensing unit 207 and the memory unit 209 are in communication with the controlling unit 205. According to ultrasonic detection, infrared detection or focus pulse calculation, the sensing unit 207 may estimate the object distance h1. The memory unit 209 is used for recording a plurality of shooting zone sizes corresponding to a plurality of object distances and a plurality of viewable angles of the lens 201.

Optionally, the proportional relations between a plurality of shooting zone sizes and the total pixel number of the image sensor 203 may be recorded in the memory unit 209. In addition, a look-up table correlating the plurality of shooting zone sizes with the plurality of proportional relations may be recorded in the memory unit 209. The look-up table is accessible by the controlling unit 205. Once the shooting zone size is known, a corresponding proportional relation will be rapidly found from the look-up table.

The above parameters are stored and recorded in the memory unit 209. When the document camera 20 is operated to observe the object 21, the controlling unit 205 may quickly perform the size conversion by referring to the look-up table. In this situation, the estimation speed of the actual size of the object 21 is enhanced.

The document camera 20 of the present invention may provide the image of the object 21. Moreover, the document camera 20 may be in communication with a pointing device 25 (e.g. a mouse or a touchpad). By operating the pointing device 25, the user may select a line segment or a region enclosing the object image 223 in the digital image 221. According to the same approach of estimating the actual size of the object 21, the actual size of the line segment or the region (e.g. the length of the line segment or the area of the region) may be acquired. Moreover, if the pointing device 25 provides a zooming function for adjusting the zooming display of the digital image 221, the user may select and zoom in/out a specified line segment or region in the digital image 221 and estimate the length of the line segment or the area of the region. In this situation, minute observation on the structure or construction of the object 21 is possible by using the document camera 20.

Figure 2B:
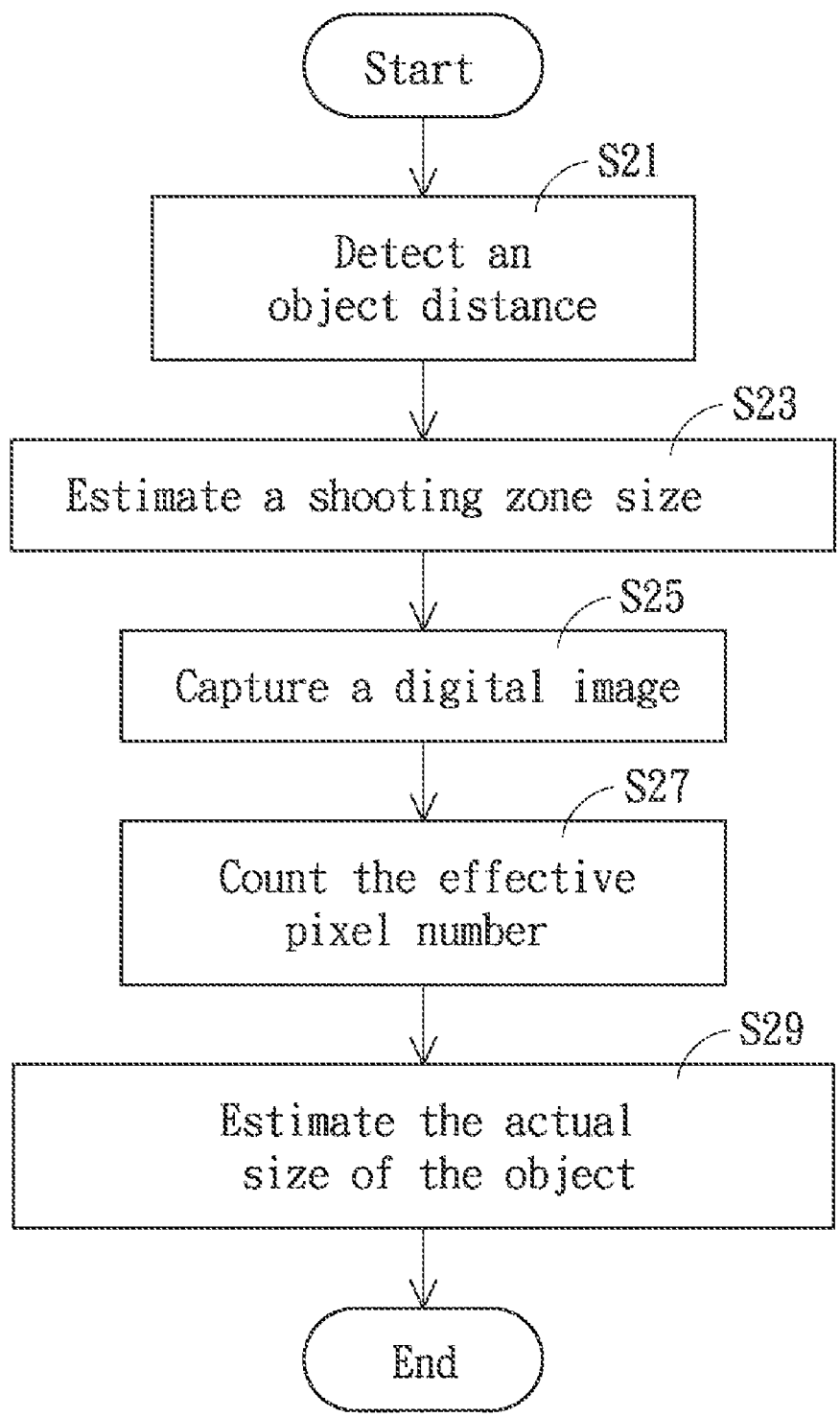
FIG. 2B is a flowchart illustrating a method for estimating the actual size of the object.

FIG. 2B is a flowchart illustrating a method for estimating the actual size of the object. First of all, in the step S21, the document camera 20 detects the object distance h1 between the lens 201 of the document camera 20 and the object 21. In the step S23, a shooting zone size is estimated according to the object distance h1 and a viewable angle of the lens 201. In the step S25, the object 21 is shot by the lens 201 of the image sensor 203, thereby capturing a digital image 221. In the step S27, the effective pixel number corresponding to the object image 223 in the digital image 221 is counted. Afterwards, an actual size of the object 21 will be estimated according to the effective pixel number, the total pixel number of the image sensor 203 and the shooting zone size (in the step S29).

In other words, in the step S29, after the proportional relation between the shooting zone size and the total pixel number of the image sensor 203 are obtained by the controlling unit 205 of the document camera 20, the actual size of the object 21 will be estimated according to the proportional relation and the effective pixel number.

The above parameters are used for acquiring the proportional relation and carrying out the estimation. It is to be noted that the approaches of obtaining the parameters are not restricted. For example, the viewable angle of the lens 201 may be preset or dynamically adjusted. In addition, the total pixel number of the image sensor 203 may be either a fixed value or a variable value that is set by the user.

Figure 2C:
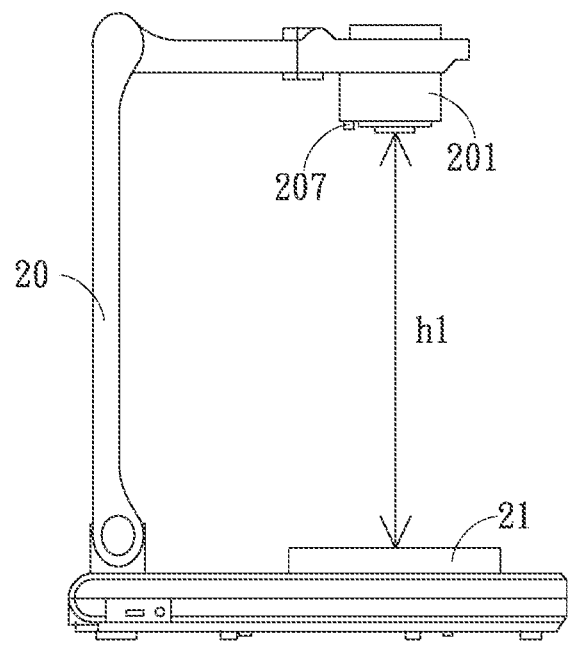
FIG. 2C is a schematic diagram illustrating the object distance between the lens of the document camera and the object.

FIG. 2C is a schematic diagram illustrating the object distance h1 between the lens 201 of the document camera 20 and the object 21. The object distance h1 is measured by the sensing unit 207 according to ultrasonic detection, infrared detection or a focus pulse calculation.

Figure 2D:
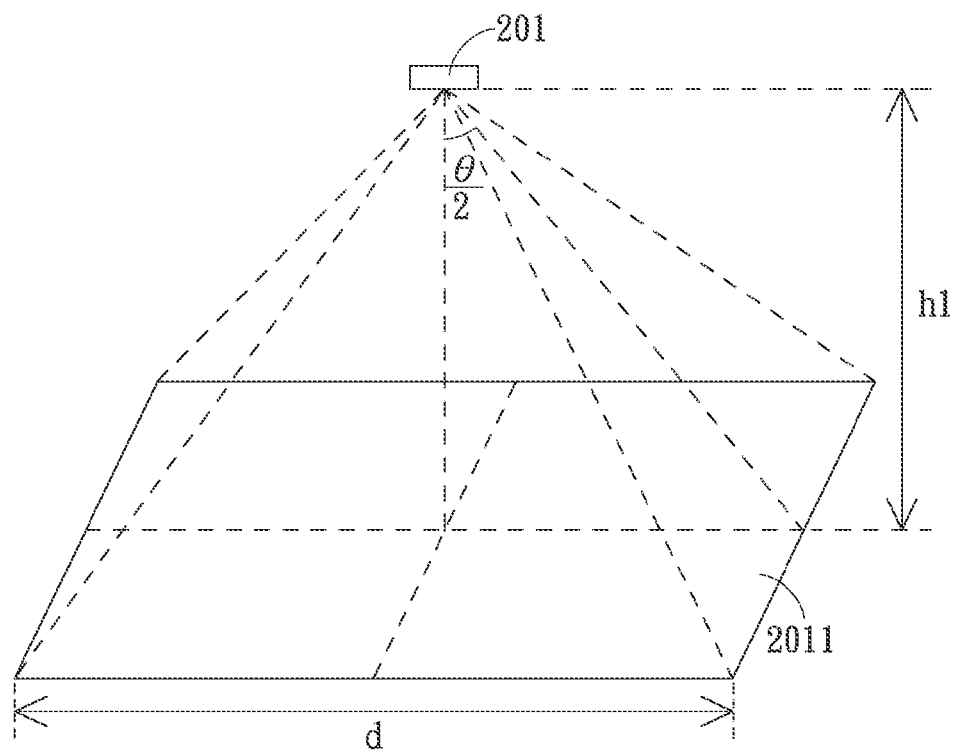
FIG. 2D is a schematic diagram illustrating an approach of estimating the shooting zone size according to the object distance and a viewable angle of the lens.

FIG. 2D is a schematic diagram illustrating an approach of estimating the shooting zone size according to the object distance h1 and a viewable angle θ of the lens 201. As shown in FIG. 2D, the shooting zone 2011 is resulted from the viewable angle θ of the lens 201. For clarification, only a half of the viewable angle θ (i.e. θ/2) is shown in the drawing. The viewable angle θ may be varied along the length direction or the width direction. The viewable angle θ may be preset in the memory unit 209 before the document camera 20 is introduced to the market, or adaptively adjusted by the controlling unit 205 through a control driving motor (not shown), or manually adjusted by the user.

After the object distance h1 and a viewable angle θ of the lens 201 are acquired, a shooting zone length d may be calculated based on a trigonometric function: $d=2\times(h1\times\tan(\theta/2))$. According to the shooting zone length d, the shooting zone 2011 of the lens 201 is determined. The profile of the shooting zone 2011 is not restricted. That is, depending on the position and rotatability of the lens 201, the profile of the shooting zone 2011 is variable. For example, the shooting zone 2011 may be square, rectangular or circular. The side length or radius can be obtained based on the same principle.

After the digital image 221 is acquired, the digital image 221 may be divided into an object image corresponding to the object 21 and a background image corresponding to the non-object part. Depending on the background image (e.g. plain background or complicated background), the approach of acquiring the object image is different.

Figures 3A, 3B:
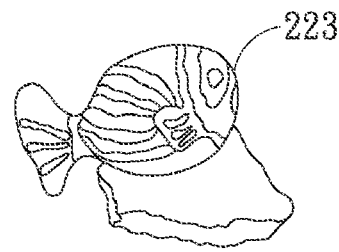
FIG. 3A is a schematic diagram illustrating an object image.
FIG. 3B is a schematic diagram illustrating the image data of the object image.

FIG. 3A is a schematic diagram illustrating an object image. FIG. 3B is a schematic diagram illustrating the image data of the object image. After the digital image 221 is acquired by the image sensor 203, the controlling unit 205 will analyze the pixels in the digital image 221. As shown in FIG. 3B, the pixels corresponding to the object image 223 are denoted as effective pixels and expressed by the values "1"; and the pixels corresponding to the background image are expressed by the values "0". It is found that the effective pixels corresponding to the object 21 are ranged from the 222nd to the 1888th columns and from the 112th to the 2445th rows. After the effective pixel number is counted, the actual size of the object 21 is estimated according to the proportional relation and the effective pixel number.

As shown in FIG. 3B, since the digital image 221 is composed of 2591 rows and 1944 columns of pixels, the total pixel number of the image sensor 203 is equal to 1944×2591. After the shooting zone size is estimated according to the object distance h1 and a viewable angle θ of the lens 201, the proportional relation between the shooting zone size and the total pixel number of the image sensor 203 will be acquired.

After the proportional relation is obtained, the effective pixel number is counted in order to estimate the actual size of the object 21. It is noted that, as the total pixel number of the image sensor 203 increases, the resolution of the digital image increases. In this situation, the proportional relation is more precious for facilitating more accurate estimation of the actual size of the object 21.

Figure 4A:
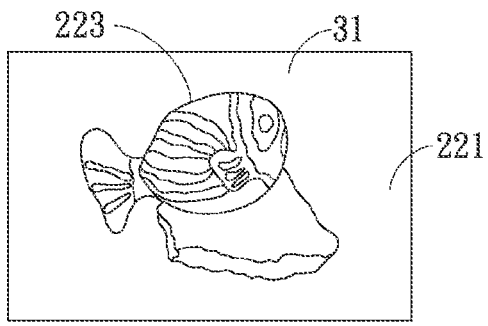
FIGS. 4A and 4B are schematic diagrams illustrating the approach of acquiring the object image when the digital image has a plain background.
Figure 4B:
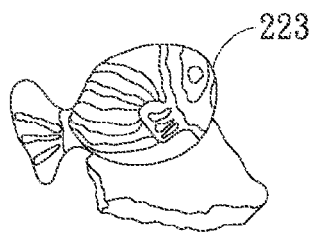

FIGS. 4A and 4B are schematic diagrams illustrating the approach of acquiring the object image when the digital image has a plain background. After the digital image 221 as shown in FIG. 4A is obtained, a digital image filtering operation (e.g. grayscale processing) is performed on the digital image 221 to filter out the background image 31, and thus the object image 223 is extracted (see FIG. 4B).

Figure 5A:
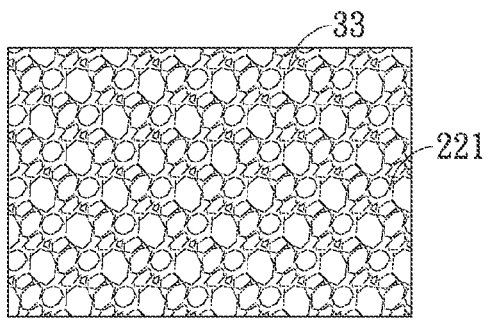
FIGS. 5A and 5B are schematic diagrams illustrating the approach of acquiring the object image when the digital image has a complicated background.
Figure 5B:
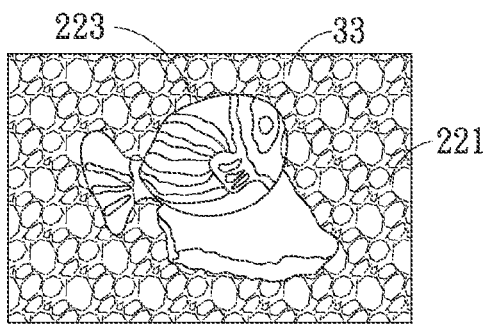

FIGS. 5A and 5B are schematic diagrams illustrating the approach of acquiring the object image when the digital image has a complicated background. A first digital image (see FIG. 5A) is firstly obtained by shooting the background where no object 21 is placed. Then, the object 21 is placed within the shooting range, and the object 21 and the background are shot to obtain a second digital image including the object image 223 and the background image 33 (see FIG. 5B). By comparing the second digital image with the first digital image, the controlling unit 205 of the document camera 20 may extract the object image 223 to get associated information (e.g. effective pixels). Accordingly, the actual size of the object 21 may be further estimated.

In accordance with a key feature of the present invention, the proportional relation between the shooting zone size and the total pixel number of the image sensor 203 of the document camera 20 should be firstly acquired. According to the proportional relation and the effective pixel number, the actual size of the object 21 is estimated.

The details about the estimation of the actual size may be varied according to the overall architecture of the document camera 20. For example, it is not necessary to instantly perform the size estimation of the object image 223. After the digital image 221 is acquired, the image date associated with the digital image 221 may be saved as an image file and stored in the memory unit 209 or any other storage device. The data associated with the viewable angle, the shooting zone size and the actual size may be saved as appended parameters. The image data and the appended parameters may be collectively or separately saved. In an on-line or off-line state, the image data and the appended parameters may be used to estimate the actual size later. Moreover, the estimation of the actual size may be performed by the document camera 20 or the display device 22.

According to the present invention, the region to be estimated may be manually selected or automatically determined by a detecting procedure, and then the effective pixel number corresponding to the selected region is counted. In comparison with the conventional size estimation method using the ruler 13, the application of the present invention is largely enhanced. The size estimation method of the present invention is able to estimate the diagonal length or even the size of a curve or an irregular pattern. For example, after the digital image 221 is captured by the lens 201, the digital image 221 is processed to remove the high-contrast part, and thus an outline corresponding to the object 21 is obtained. After the outline corresponding to the object 21 is obtained, the perimeter and the area of the object 21 will be automatically calculated. Alternatively, after any line segment or region in the digital image 221 is marked or selected by the user, the actual size corresponding to the selected or marked portion will be estimated.

Figure 6A:
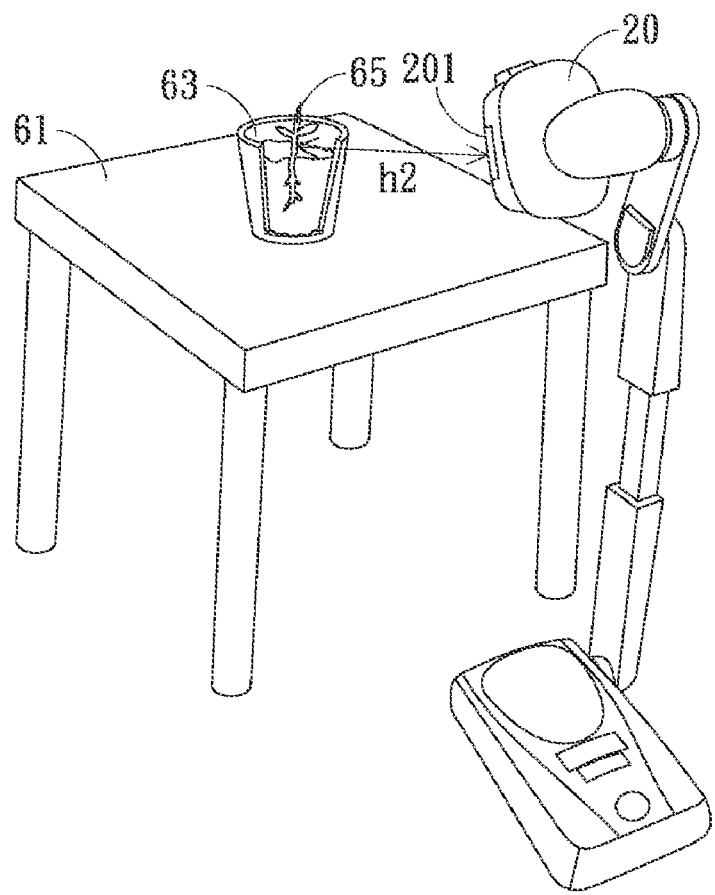
FIGS. 6A and 6B are schematic diagrams illustrating the application of the document camera of the present invention in observing plant growth.
Figure 6B:
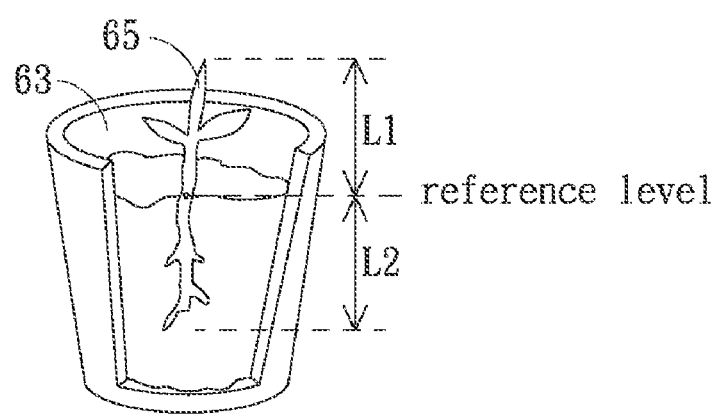

FIGS. 6A and 6B are schematic diagrams illustrating the application of the document camera of the present invention in observing plant growth. As shown in FIG. 6A, the document camera 20 is used to observe growth process of a potted plant 65, which is placed within a container 63 on a desk 61. Firstly, the document camera 20 detects the object distance h2 between the potted plant 65 and the lens 201. After the object distance h2 is acquired, the actual size estimation method of the present invention may be used to observe growth of the potted plant 65. For facilitating observation, the container 63 has a special design to show the whole plant 65. As shown in FIG. 6B, a reference level between the root part and the stem part of the potted plant 65 is predetermined. The length above the reference level is defined as a steam length L1, and the length under the reference level is defined as a root length L2.

The steam length L1 and the root length L2 are estimated by the actual size estimation method of the present invention. As such, the user may clearly observe the growth process of the potted plant 65. According to settings of the controlling unit 205, the document camera 20 may periodically shoot the potted plant 65 (for example every hour). In this situation, the user does not need to stand by the potted plant 65 to personally operate the document camera 20 to shoot the potted plant 65.

In some embodiments, the estimated size may be shown on the digital images 221. As such, the user may easily realize the change of the steam length L1 and the root length L2 during the growth process of the potted plant 65. Moreover, the document camera 20 may provide a network accessing function. When the document camera 20 is in communication with the network, the user may easily acquire the records about the growth process of the potted plant 65 according to a remote monitoring technology. Furthermore, if the orientation of the lens 201 may be remotely controlled, the applications of the document camera 20 of the present invention will be further increased.

Figure 7A:
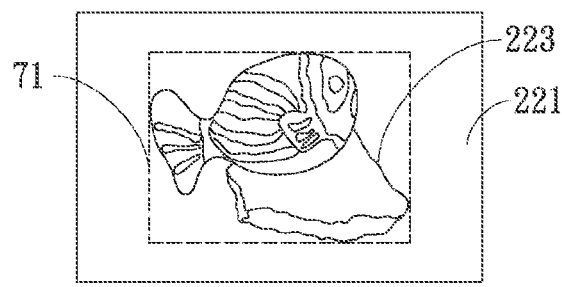
FIGS. 7A, 7B, 7C and 7D are schematic diagrams illustrating several applications showing the object image with reference scales or size estimation results.
Figure 7B:
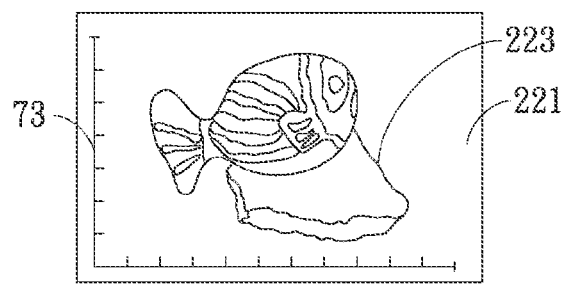

For helping the user in realizing the actual size of the object 21, some reference bases may be shown on the display device 22. FIG. 7A is schematic diagram illustrating a circumscribed boundary 71 around the object image 223. To indicate the length and width of the object 21, grids (not shown) may be provided within the boundary 71. FIG. 7B is schematic diagram illustrating reference scales 73 provided on sides of the digital image 221 to be referred.

In accordance with the present invention, the actual size of the object 21 is obtained according to the effective pixel number. The user may operate a pointing device (e.g. a mouse) to zoom in/out a marked region in the digital image 221 shown on the display device 22. During the zooming in/out operation, the reference scales 73 or the grids within the circumscribed boundary 71 are adjusted automatically and correspondingly. For example, as the marked region in the digital image is enlarged, the reference scales 73 or the grids within the circumscribed boundary 71 in a unit of centimeter will be changed to be expressed in a unit of millimeter.

Moreover, by operating the pointing device 25 (e.g. a mouse or a touchpad), the user may select a line segment or a region. By using the same approach of estimating the actual size of the object 21, the length of the line segment or the area of the region may be acquired.

Figure 7C:
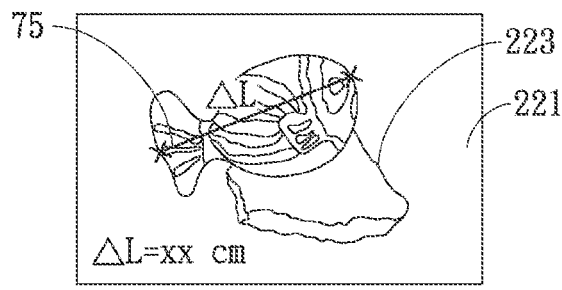

FIG. 7C is a schematic diagram illustrating an approach of estimating an actual length corresponding to a marked line segment. For realizing the body length of the fish-like sculpture, the user may draw a line segment 75. As a consequence, the actual size corresponding to the marked line segment 75 is obtained by the size estimation method.

Figure 7D:
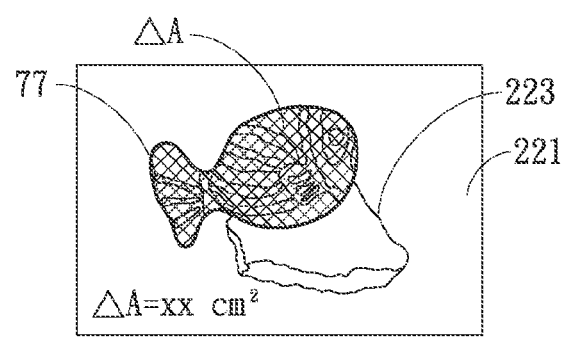

FIG. 7D is a schematic diagram illustrating an approach of estimating an actual area corresponding to a marked region. The size estimation method may further provide a function of calculating the area of the marked region 77. By counting the effective pixel number corresponding to the marked region 77, the actual area of the fish-like sculpture will be estimated. Alternatively, by circumscribing the body periphery of the fish-like sculpture with the marked region 77, the actual perimeter of the fish-like sculpture will be estimated according to the same principle.

As described in FIG. 7, some reference bases are shown on the display device 22 for helping the user in estimating the actual size of the object 21. It is to be noted that, however, numerous modifications and alterations may be made while retaining the teachings of the invention. For example, the concepts of FIG. 7A and FIG. 7C may be combined together. That is, after the object image 223 is enclosed by the circumscribed boundary, by operating the pointing device 25 (e.g. a mouse or a touchpad) to select a line segment or a region, the actual length corresponding to the selected line segment and the actual area corresponding to the selected region will be shown on the display device 22.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A size estimation method for use with a document camera to estimate an actual size of an object being shot by the document camera, the document camera comprising a lens and an image sensor, the size estimation method comprising steps of:
    detecting an object distance between the lens and the object;
    estimating a shooting zone size according to the object distance and a viewable angle of the lens;
    shooting the object by the lens and the image sensor, thereby acquiring a digital image including an object image;
    counting an effective pixel number corresponding to the object image in the digital image; and
    estimating the actual size of the object according to a proportional relation among the effective pixel number, a total pixel number of the image sensor and the shooting zone size.

2. The size estimation method according to claim 1 wherein the object distance is detected according to ultrasonic detection, infrared detection or focus pulse calculation.

3. The size estimation method according to claim 1 wherein the viewable angle of the lens is fixed or adjustable.

4. The size estimation method according to claim 1 wherein the step of estimating the shooting zone size further comprises steps of:
    calculating a side length or a radius of a shooting zone having the shooting zone size based on a trigonometric function; and
    calculating the shooting zone size according to the side length or the radius.

5. The size estimation method according to 1 wherein before the step of counting the effective pixel number corresponding to the object image, the size estimation method further comprises a step of extracting the object image by filtering out a background image in the digital image.

6. The size estimation method according to 1 wherein before the step of counting the effective pixel number corresponding to the object image, the size estimation method further comprises steps of:
- shooting background while the object is removed to acquire a reference image; and
- comparing the reference image and the digital image to extract the object image.

7. The size estimation method according to claim 1 wherein before the effective pixel number is counted, effective pixels are selected through a pointing device or automatically determined wherein the effective pixels corresponds to a line segment or a region.

8. The size estimation method according to claim 1 wherein the digital image and the estimated size are separately or collectively stored in a memory unit.

9. The size estimation method according to claim 1 wherein the step of estimating the size of the object further comprises steps of:
- acquiring the proportional relation between the shooting zone size and the total pixel number of the image sensor; and
- calculating the size of the object according to the proportional relation and the effective pixel number.

10. The size estimation method according to claim 1, further comprising steps of:
- showing the digital image by a display device in communication with the document camera; and
- showing a reference scale or reference grids on the digital image, wherein the reference scale or reference grids are adjustable according to zoom in/out operation.

11. The size estimation method according to claim 1 wherein the total pixel number of the image sensor is a fixed value or an adjustable value.

12. A document camera for observing an object, the document camera comprising:
- a lens separated from the object by an object distance and having a viewable angle, wherein a shooting zone size is estimated according to the object distance and the viewable angle of the lens;
- an image sensor in communication with the lens for capturing a digital image including an object image by shooting the object; and
- a controlling unit in communication with the image sensor for counting an effective pixel number corresponding to the object image in the digital image, and estimating an actual size of the object according to a proportional relation among the effective pixel number, a total pixel number of the image sensor and the shooting zone size.

13. The document camera according to claim 12 wherein the controlling unit acquires the proportional relation between the shooting zone size and the total pixel number of the image sensor, and estimates the actual size of the object according to the proportional relation and the effective pixel number.

14. The document camera according to claim 12 wherein the document camera further comprises a sensing unit in communication with the controlling unit for detecting the object distance according to ultrasonic detection, infrared detection or focus pulse calculation.

15. The document camera according to claim 12 wherein the viewable angle of the lens is a fixed angle or an adjustable angle.

16. The document camera according to claim 12 wherein the document camera is in communication with a display device showing the digital image and optionally showing a reference scale or reference grids on the digital image.

17. The document camera according to claim 12 wherein the document camera further comprises a memory unit in communication with the controlling unit for recording a plurality of proportional relations between a plurality of shooting zone sizes and the total pixel number of the image sensor, wherein a look-up table correlating the plurality of shooting zone sizes with the plurality of proportional relations is recorded in the memory unit and accessible by the controlling unit.

18. The document camera according to claim 12 wherein the total pixel number of the image sensor is a fixed value or an adjustable value.

19. The document camera according to claim 12 wherein the document camera is in communication with a pointing device used for selecting effective pixels before the controlling unit counts the effective pixel number wherein the effective pixels corresponds to a line segment or a region.

20. The document camera according to claim 12 wherein the document camera has a zooming in/out function.

* * * * *